United States Patent [19]

Meibach et al.

[11] Patent Number: 5,487,912

[45] Date of Patent: Jan. 30, 1996

[54] METHOD OF PRODUCING CHOLESTEROL-REDUCED WHOLE EGG PRODUCTS

[75] Inventors: Ronald L. Meibach, Deerfield; Pamela S. Hockenberry, Evanston; Bilal Kaafarani, Hoffman Estates, all of Ill.

[73] Assignee: Kraft Foods, Inc., Northfield, Ill.

[21] Appl. No.: 431,624

[22] Filed: May 1, 1995

Related U.S. Application Data

[63] Continuation of Ser. No. 212,276, Mar. 19, 1994, abandoned, which is a continuation-in-part of Ser. No. 102,114, Aug. 4, 1993, abandoned, which is a continuation of Ser. No. 829,398, Feb. 3, 1992, abandoned.

[51] Int. Cl.$^6$ ..................................................... A23L 1/32
[52] U.S. Cl. ........................... 426/614; 426/429; 426/437; 426/519
[58] Field of Search ................................ 426/417, 442, 426/422, 424, 425, 429, 614, 437, 519

[56] References Cited

U.S. PATENT DOCUMENTS

| | | | |
|---|---|---|---|
| 5,019,407 | 5/1991 | Swartzel et al. | 426/399 |
| 5,091,203 | 2/1992 | Conte, Jr. et al. | 426/614 |
| 5,096,730 | 3/1992 | Singer et al. | 426/583 |

FOREIGN PATENT DOCUMENTS 048818  4/1982  European Pat. Off. .

*Primary Examiner*—Anthony J. Weier
*Attorney, Agent, or Firm*—Fitch, Even, Tabin & Flannery

[57] ABSTRACT

A method of producing a cholesterol-reduced whole egg product by mixing cholesterol-reduced egg yolk with concentrated egg whites and vegetable oil at a ratio of about 1:0.7:0.05 to about 1:1.2:0.2, where the cholesterol-reduced egg yolk is produced by shearing a mixture of oil:egg yolk:egg white permeate at a ratio of about 4:1:0.8 to about 1.5:1:0.2; where the temperature of the mixture during shearing is between about 124° F. to about 148° F. in the mixture.

34 Claims, 1 Drawing Sheet

METHOD OF PRODUCING CHOLESTEROL-REDUCED WHOLE EGG PRODUCTS

CROSS REFERENCE TO RELATED APPLICATIONS

This application is a continuation, of application Ser. No. 212,276 filed Mar. 14, 1994, now abandoned, which is a continuation-in-part of application Ser. No. 102,114, filed Aug. 4, 1993, now abandoned, which is a continuation of application Ser. No. 829,398 filed Feb. 3, 1992, now abandoned.

BACKGROUND OF THE INVENTION

This invention relates to a method for cholesterol removal in egg and egg yolk products to produce a cholesterol-reduced whole egg product.

Eggs are a popular and desirable component of the human diet both in terms of taste and nutritional value. The liquid portion of whole egg consists of about 64% white and 36% yolk. The egg white or egg albumen is essentially an aqueous solution of proteins containing small amounts of minerals and sugars with only a trace of fat. However, the egg yolk contains virtually all the fat and cholesterol of whole eggs. Unfortunately, egg yolk is very high in cholesterol, with a cholesterol content of approximately 1.2% of the egg yolk weight. Furthermore, about one-third of the yolk weight is fat. Fatty acid analysis shows that the fat content of an average yolk is 35.4% saturated fat (principally palmitic and stearic acids), 49.1% monounsaturated fat (oleic acid), and 15.5% polyunsaturated fat (linoleic acid). Thus, the ratio of polyunsaturated fat to saturated fat is less than 1 to 2, which is an undesirable balance.

Several approaches have been utilized to reduce cholesterol levels in food products. For example, U.S. Pat. No. 4,804,555 discloses a process for the simultaneous deodorization and cholesterol level reduction of fish oils. The fish oil is deaerated, mixed with steam, heated, flash vaporized, thin film-stripped with a countercurrent stream, and cooled. U.S. Pat. No. 4,255,455 describes a process for preparing casein with lowered cholesterol content. The process comprises dispersing a casein-cholesterol bond-reducing emulsifying agent in an aqueous medium containing casein and cholesterol, with subsequent isolation of casein from the medium.

A number of methods have been developed to remove cholesterol from egg products and egg yolks. One approach utilizes microorganisms to enzymatically oxidize and degrade cholesterol [Japanese Patent 60-18375], but this method produces cholesterol oxidation products which may be undesirable. Another enzymatic approach is described in U.S. Pat. No. 4,980,180 where α-amylase is mixed with egg yolk to facilitate the removal of β-cyclodextrin. An alternative approach to cholesterol reduction is described in U.S. Pat. No. 4,882,193, where a low fat egg product is produced by diluting overly rich yolks with albumin.

Another approach to cholesterol removal is to extract cholesterol using organic solvents such as diethyl ether, methylene chloride, ethyl acetate, hexane, and benzene [JP 48/44458, U.S. Pat. Nos. 4,104,286, 3,881,034, 3,563,765, 4,234,619 and Tokarska, et al., Can. Inst. Food Sci. Tech. J., 18:256–258 (1985)]. For example, U.S. Pat. No. 2,234,619 describes a method for cholesterol removal from eggs by dehydrating the eggs, extracting the cholesterol with liquid dimethyl ether under anhydrous conditions and removing the dimethyl ether by treatment under reduced pressure at low temperatures. U.S. Pat. No. 4,104,286 describes the isolation of cholesterol from eggs through extraction with ethanol, saponification in an aqueous ethanolic alkali metal hydroxide and concentration and purification with a hydrocarbon solvent and methanol.

Solvent extraction processes have several disadvantages. First, solvent extraction and subsequent drying results in the yolk having poor taste and texture when cooked. Second, solvent extraction methods may involve significant processing steps to remove solvents. Third, even with supercritical carbon dioxide as the solvent, the selectivity of cholesterol extraction over triglycerides may be limited [*Prepared Foods*, 157:186 (1988); JP 59/135847].

Edible vegetable oils have also been used to extract cholesterol from egg yolks, as described in U.S. Pat. Nos. 3,717,414; 4,103,040 and 4,333,959. U.S. Pat. No. 3,594,183 describes the extraction of fat and cholesterol from egg yolk with vegetable oil, salt, emulsifiers, and coloring agents, followed by drying.

Thus, it would be desirable to provide egg products having desirable functional characteristics of egg yolk products (e.g., protein and phospholipids), while reducing the cholesterol level and increasing the polyunsaturated fat to saturated fat ratio. It would further be desirable to do this while retaining the functionality, appearance and taste of natural eggs which would yield good texture upon being cooked, thus avoiding dried egg products and the like.

SUMMARY OF THE INVENTION

It is therefore an object of this invention to produce whole egg products which are substantially lower in cholesterol than normal eggs. It is a further object of this invention to produce reduced cholesterol egg yolks and egg products therefrom which have a polyunsaturated fat to saturated fat ratio of 1 or greater, i.e., the polyunsaturated fat content is equal to or greater than the saturated fat content. In achieving the above objects, it is an overall object of this invention to obtain egg products having the functionality of natural eggs.

Generally, our invention accomplishes these and other results by combining egg white permeate with egg yolk and an edible oil, preferably high in polyunsaturated fats, using a high energy, high shear mixer.

During the mixing, the cholesterol is extracted from the yolk into the oil. Simultaneously, if a polyunsaturated fat is used, the polyunsaturated fat content of the yolk is increased, raising the polyunsaturated/saturated ratio. The yolk is then separated gravitationally from the oil and recovered. The yolk is still wet, having its water content intact.

The cholesterol-reduced egg yolks are recombined with vegetable oil and concentrated egg whites to produce a whole egg product. To control the properties of the final product, any of the following ingredients can be added in the mixing or recombination steps: food grade acids, flavors, nutrients, colors and mixtures thereof. The cholesterol-reduced whole egg product can be pasteurized and aseptically packaged for extended shelf life. The use of permeate resulted in improved flavor in the final product as compared to the use of water in the same proportions.

DETAILED DESCRIPTION OF THE INVENTION

Figure 1:
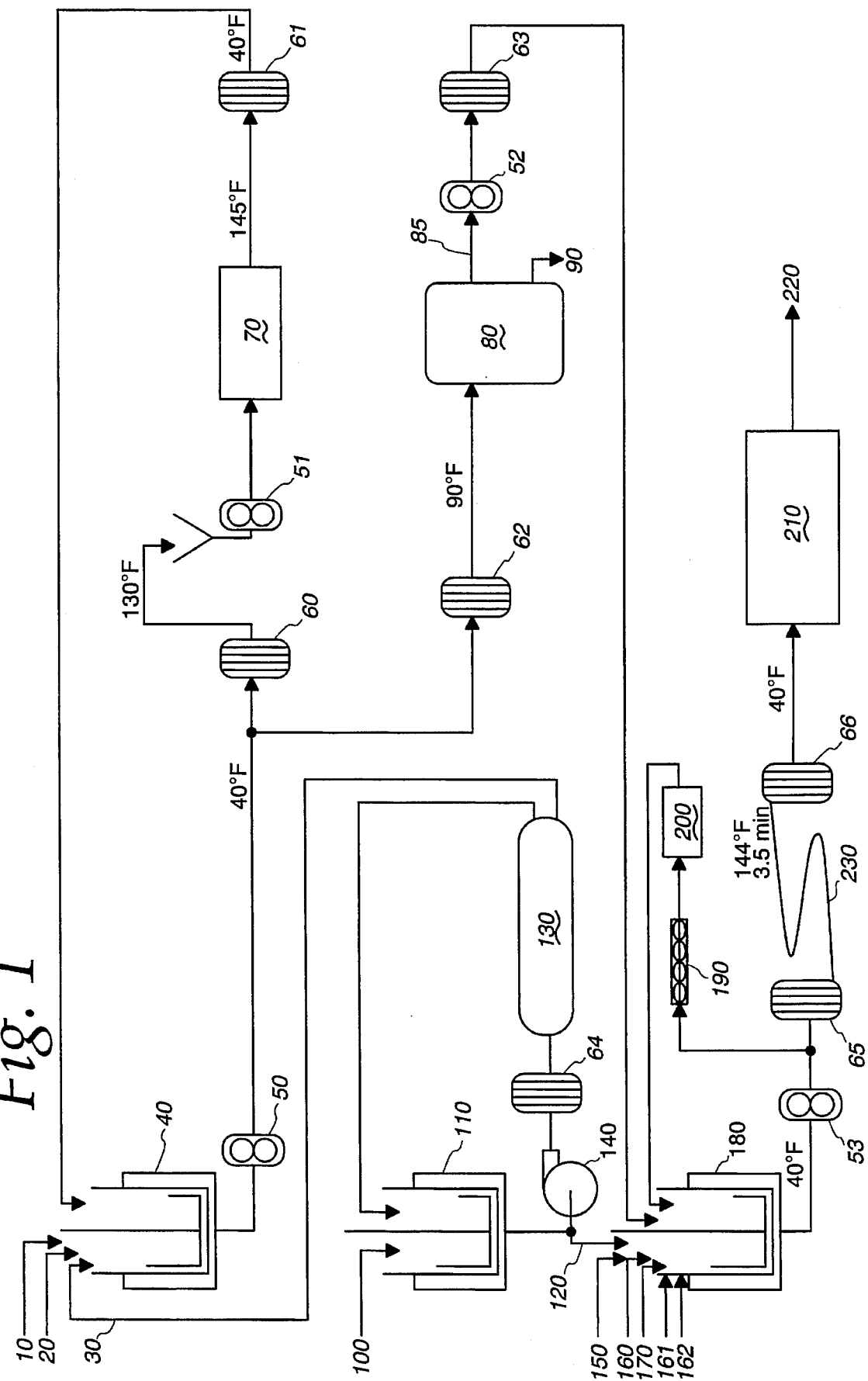
FIG. 1 is a flow diagram of a continuous process to produce cholesterol-reduced whole egg product.

To remove the cholesterol from a whole egg product, egg yolks are mixed with permeate produced from the ultrafiltration of liquid egg whites and added to vegetable oil to form a mixture. The mixture is sheared and separated by centrifugation. Vegetable oil and concentrated egg whites are combined with the cholesterol-reduced yolks to yield a cholesterol-reduced whole egg product having the same solids level as whole egg. A food grade acid and food colors can be added in the mixing or recombination steps to control color. Nutrients can also be added. The resulting product can be pasteurized and aseptically packaged for extended shelf life. The whole egg product has a reduced cholesterol value and can be used like whole eggs, i.e., in baked goods, puddings, desserts such as ice cream, in pasta, egg dishes, such as omelets, viscous products as mayonnaise and the like.

The eggs are preferably separated such that only the egg yolks are treated; however, if desired, whole eggs may be treated. Pasteurized or unpasteurized eggs can be used in this process. The separated yolks may be combined after treatment with the whites and used as one would similarly use whole eggs. The treated yolks, whether combined with the egg whites or not, can be packaged fresh or frozen. In addition, this invention is not limited to treating fresh eggs; therefore, frozen eggs, salted egg yolks, and dried yolks that have been hydrated may also be decholesterolized. It should also be noted that egg yolks naturally contain a small percentage of water. The egg yolk can be referred to as being "wet", which means that the yolk has its natural water content. According to Kirk and Othmer, *Encyclopedia of Chemical Technology*, Vol. 5 (1947) p. 465 (at 466), an egg yolk contains about 9.10 g or 48.7% water. The ratios provided herein do include the natural water content of the egg yolk.

The egg yolks are separated from the whites and then mixed with egg white permeate to form a premix. The permeate is produced by the ultrafiltration of egg whites. Ultrafiltration was conducted using an ultrafiltration (UF) membrane at a product temperature from about 40° F. to about 60° F. to provide a permeate and a retentate, which is concentrated egg whites. The permeate contains from about 0.8% to about 1.0% total solids which include from about 0.3% to about 0.35% sodium chloride, from about 0.02% to about 0.04% protein, from about 0.1% to about 0.3% glucose and from about 0.09% to about 0.11% of each of fructose, sucrose, lactose and maltose. All percentages used herein are by weight unless otherwise indicated. The concentrated egg whites contain from about 14% to about 20% total solids which include from about 14% to about 16% protein, from about 0.17% to about 0.34% sodium chloride, from about 0.1% to about 0.3% glucose and from about 0.09% to about 0.11% of each of fructose, sucrose, lactose and maltose. Preferably, unsalted egg whites, either unpasteurized or pasteurized, are utilized.

The premix is then combined with an oil to form a mixture, preferably a vegetable oil. Preferably, the premix is added to the vegetable oil after the vegetable oil has been heated to a temperature of about 110° F. to about 125° F., more preferably about 115° F. to about 120° F. If the oil has not been preheated, the mixture can be heated to the temperatures as described above. If salted egg yolk is used, the yolk comprises not more than 14%, but typically between about 6% to about 14% salt, which is added to the yolk on a total yolk weight basis. Although it is preferred to form a premix, the order of addition is not critical and all of the ingredients (oil, egg yolk, permeate, flavorings and the like) may be combined simultaneously to form the mixture.

The ratio of ingredients, oil:yolk:permeate, is typically about 4:1:0.8 to about 1.5:1:0.2 or any combinations within these ranges, more preferably about 3:1:0.6 to about 2:1:0.3. A limiting factor in formulating the ratio of ingredients is that the more oil added, the more cholesterol removed. However, using too much oil is inefficient and expensive. If too little oil is added, an oil-in-water emulsion is formed. When an oil-in-water emulsion is formed, it is extremely difficult, if not impossible, to separate the phases and thereby extract the cholesterol.

If so desired, the permeate can be diluted with water. The dilution amount may vary so long as the mixture of permeate and water is within the range of about 0.8 to about 0.2 to 1 part egg yolk. Preferably about 0.6 to about 0.3 to 1 part egg yolk (including the natural water content of the egg yolk) is used. Furthermore, the water can be added to either the permeate, oil, or egg yolks, or after the permeate and egg yolks are blended. The advantages of utilizing water in an oil extraction process are discussed in U.S. patent application Ser. No. 097,589, filed Jul. 26, 1993, the nonessential teachings of which are incorporated herein by reference.

Although any oil such as cottonseed oil, lard, palm oil, beef tallow, butterfat, coconut oil and the like can be used, oils of particular interest are vegetable oils. Vegetable oils high in polyunsaturated fat are of the most interest. Typical vegetable oils could include the following: safflower oil, corn oil, sunflower oil, soybean oil, canola oil, olive oil, peanut oil and the like. Additionally, a blend of these oils could be used. Most preferably, safflower or soybean oil are used herein. The egg yolks may be salted or unsalted, whichever is applicable for the ultimate end use.

After all the ingredients are combined the mixture is sheared. There are no specific requirements as to the type of shearing device used. Generally, any mixer could be used as a shearing device which could include, but not be limited to, high shear mixers and dispersers, in-line mixer homogenizers and the like. The process herein can be accomplished by use of apparatus such as PENTAX™ mixers, Hydroshear mixers, and high pressure homogenizers; however, the process should not be limited to such apparatus. To form the whole egg product, the treated egg yolks, vegetable oil, colors, nutrients and flavors are mixed in a batch tank using a turbine type mixer or pumped through an in-line static mixer connected to a Hydroshear mixer. The concentrated egg whites are then gently mixed into the batch using the batch tank agitator at slow speed for a few minutes. The temperature during shearing is preferably between about 124° F. and about 148° F., more preferably between about 135° F. to about 145° F., most preferred is between about 140° F. and 145° F. At higher temperatures, greater rates of cholesterol are extracted; however, at these higher temperatures there is a problem with protein denaturing. The temperature is preferably controlled at the inlet temperature prior to shearing. Typically, the mixture is processed with a KMF-30 PENTAX™ mixer operated at greater than 1500 rpm. Generally, the mixer is operated between about 1500 rpm and about 3,600 rpm.

After shearing, the oil containing cholesterol is easily separated from the mixture by centrifugation. Any means may be used to separate the oil containing cholesterol from the egg yolks, but typically centrifugation is generally used or cyclones could be used. After separating the oil from the egg yolk dilution, the cholesterol contained in the oil may be removed by steam stripping or molecular distillation, and the oil can then be recycled.

The cholesterol-reduced egg yolks are recombined with vegetable oil and concentrated egg whites, colors, flavors, nutrients, or food grade acid to form the cholesterol-reduced whole egg product. The ratio of ingredients, cholesterol-reduced yolks:concentrated egg whites:vegetable oil, is typically between about 1:0.7:0.05 to about 1:1.2:0.2 or any combinations within these ranges, more preferably about 1:0.8:0.08 to about 1:1:0.15. It is an important advantage of the present invention that the permeate which remains with the cholesterol reduced egg yolk and the concentrated egg white can be used at levels which match the original egg white which had been treated by ultrafiltration to produce the permeate and concentrated egg white. The composition of the resulting reconstituted egg product is thus substantially the same as natural eggs, with the exception that an unsaturated oil has replaced the saturated fat of egg yolk and the cholesterol level has been reduced.

Preferably, the cholesterol-reduced egg yolks are recombined with the vegetable oil and concentrated egg whites at a temperature of about 35° F. to about 60° F., more preferably about 40° F. to about 50° F.

The recombination of vegetable oil and concentrated egg whites with the cholesterol-reduced egg yolks provides several advantages. First, addition of vegetable oil at the recombination step compensates for egg fat lost during centrifugation, and results in improved texture and functionality. Second, concentrated egg whites are added to compensate for permeate used which obviates the need for dry egg whites which can adversely affect flavor and texture. Third, the need for concentrating cholesterol-reduced yolks to compensate for added permeate is eliminated.

The color of the product can be controlled with the addition of food grade acids and/or colors at either the mixing or recombination steps. When a food grade acid is combined with water, either alone or with salt, any food grade acid can be used so long as the acid lowers the pH between 6.0 to 7.0. Examples of acceptable food grade acids include, but are not limited to, acetic acid, phosphoric acid, ascorbic acid, citric acid, lactic acid, and the like. Preferably, citric acid is utilized. Citric acid can be added at a concentration of from about 0.05% to about 0.3% dry acid basis calculated on the weight of the final whole egg product at the mixing step, preferably about 0.1% to about 0.2%.

The resulting whole egg product can be further pasteurized and aseptically packaged for extended shelf life. Pasteurization is accomplished by standard methods such as use of plate or tubular heat exchangers. Aseptic packaging is accomplished by equipment such as form fill seal, preformed package or bag in box equipment.

Typically, about 70% to about 85% cholesterol is removed from the whole egg product. More preferably, about 75% to about 80% cholesterol is removed. In addition to a reduction in cholesterol, the egg product contains less saturated fatty acids, such as palmitic or stearic acid, than the untreated egg yolks. The egg product contains more polyunsaturated fat than the untreated egg yolk. This can be further illustrated by the Table below, where the ratio of ingredients for preparation of the egg product was about 4:1:0.8 to about 1.5:1:0.2. The resulting product has a reduced cholesterol value and can be used like whole eggs, i.e. in baked good, puddings, desserts such as ice cream, in pasta, egg dishes such as omelets, viscous products as mayonnaise, and the like.

| FAT COMPOSITION | | |
|---|---|---|
| Fatty Acid | CR & Whole Egg Product % | Shell Eggs % |
| Palmitic (16:0) | 16.14 | 26.51 |
| Stearic (18:0) | 6.12 | 9.17 |
| Total Saturated (14–24C) | 23.04 | 36.35 |
| Oleic (18:1) | 26.86 | 38.25 |
| Linoleic (18:2) | 46.47 | 16.28 |
| Polyunsaturated/Saturated | 2.0/1.0 | 0.45/1.0 |

*CR = Cholesterol-reduced.

FIG. 1 depicts the continuous process to produce cholesterol-reduced whole egg product. Permeate (30), produced from the ultrafiltration of egg whites (100) through an ultrafiltration membrane (130), is mixed with egg yolks (10) and soybean oil (20) in a batch tank (40). The mixture is transported via a pump (50) through a heat exchanger (60) to attain a temperature of 130° F. The heated mixture is sheared in a high shear mixer (70) and subsequently pumped via pump (51) through a heat exchanger (61) to attain a temperature of 40° F. The sheared mixture is circulated back to the batch tank (40) and passed back through the high shear mixer (70) until sufficient shear is obtained. After sufficient shearing, the mixture is passed through a heat exchanger (62) to attain a temperature of 90° F. and separated in a centrifuge (80) to yield cholesterol reduced yolks (85) and soybean oil/egg fat (90).

To obtain the permeate and concentrated egg whites (120), egg whites (100) are added to an ultrafiltration tank (110) to yield concentrated egg whites (120) and permeate (30). Egg whites are pumped via a centrifugal pump (140) through a heat exchanger (64) and ultrafiltration membrane (130). Permeate (30) is transferred to the batch tank. The concentrated egg whites (120) are returned to the ultrafiltration tank (110) and recirculated through the ultrafiltration membrane (130) until a sufficient amount of solids is attained, and is then added to the batch tank (180). Cholesterol-reduced yolks (85) are pumped via pump (52) through a heat exchanger (63) to a pasteurization tank and added to vegetable oil (150), colors (160), acid (161), nutrients (162), and flavors (170). The ingredients are pumped via pump (53) to an in-line mixer (190) connected to a Hydroshear mixer (200) and then returned to the pasteurization tank (180). After sufficient mixing, concentrated egg whites (120) are added to the pasteurization tank (180) and gently mixed with the tank agitator. The mixture is pumped via pump (53) and pasteurized in a pasteurizer (65, 230, 66). The pasteurized product is pumped through a heat exchanger (66) to attain a temperature of 40° F. and packaged in an aseptic packaging machine (210) to yield packaged cholesterol-reduced whole egg (220).

FIG. 1 further illustrates an embodiment of the invention, although the invention is not limited to this schematic.

The following examples are for illustrative purposes only and are not meant to limit or narrow the scope of the invention herein.

EXAMPLE 1

Soybean oil, 211.5 lbs., was added to a scraped surface tank and circulated at 50 lbs./min. to provide a temperature of 120° F. Liquid, unsalted egg yolk of 90 lbs. was mixed with 36 lbs. of egg white permeate and then added to the oil. The mixture was then circulated at 50 lbs./min. until the oil:egg:permeate was well mixed and reached a temperature of 120° F.

After the mixture had been warmed to 120° F., the PENTAX™ mixer was operated at 3500 rpm. During processing the mixture remained between 120° F. and 130° F. The oil:egg:permeate mixture was circulated for the length of time to reach ten passes, approximately 67.5 minutes.

The processed oil:egg:permeate mixture was centrifuged to separate the soybean oil. Approximately 76.0% of the cholesterol was extracted from the egg yolks.

A portion of the cholesterol-reduced egg yolk, 1000 g, was recombined with 119.4 g of soybean oil and 990.3 g of concentrated egg whites. Mixing was accomplished in a turbine mixer at 3600 rpm for 1 minute.

The resulting cholesterol-reduced whole egg product had the following composition:

|  | Weight (g) | % |
| --- | --- | --- |
| Cholesterol-reduced Yolks | 1000.0 | 47.4 |
| Soybean Oil | 119.4 | 4.7 |
| Concentrated Egg Whites | 990.3 | 46.9 |
| Cholesterol-reduced Whole Egg Product | 2109.7 | 100.0 |

Solids and cholesterol levels were as follows:

|  | Solids (%) | Cholesterol (mg/100 g) |
| --- | --- | --- |
| Raw Material Yolks | 45.87 | 1091 |
| Raw Material Whites | 11.78 | — |
| Concentrated Whites | 16.65 | — |
| Cholesterol-Reduced Yolks | 24.73 | 209 |
| Cholesterol-Reduced Whole Egg Product | 24.7 | 99 |
| Whole Egg Control | 24.7 | 413 |

The resulting cholesterol-reduced whole egg product retained desirable properties of taste, texture and functionality, but had significantly reduced levels of cholesterol. For example, the cholesterol-reduced whole egg product contained the same percent solid as the unprocessed whole egg control. However, the cholesterol-reduced whole egg product contained approximately 76.0% less cholesterol than the whole egg control.

EXAMPLE 2

Soybean oil, 626.7 lbs., was added to a scraped surface tank and circulated at 50 lbs./min. Unsalted, unpasteurized yolk, 266.7 lbs., was added slowly to the tank. Egg white permeate, 106.7 lbs., was then added to the egg/oil mixture. The mixture was then circulated at 50 lbs./min. for 20 minutes until well mixed.

After mixing, the PENTAX™ mixer was operated at approximately 3600 rpm. The outlet temperature from the PENTAX™ was maintained at 145° F. The temperature of the product returning to the tank was maintained at 40° F. The egg:oil:permeate mixture was circulated for the length of time to reach ten passes, approximately 200 minutes.

The processed egg:oil:permeate mixture was centrifuged to separate the soybean oil. The centrifugation yielded approximately 249 lbs. of cholesterol-reduced egg yolk, which had 76% of the cholesterol extracted.

The 249 lbs. of cholesterol-reduced egg yolk was recombined with 29.7 lbs. of soybean oil using a Hydroshear mixer with 180 lbs. of back pressure. Concentrated whites, 234.4 lbs., were mixed in using a 100 gallon Walker tank with a scraped surface agitator at low speed for a few minutes.

The resulting cholesterol-reduced whole egg product had the following composition:

|  | Weight (g) | % |
| --- | --- | --- |
| Cholesterol-reduced Yolks | 100.00 | 48.5 |
| Soybean Oil | 11.93 | 5.8 |
| Concentrated Egg Whites | 94.14 | 45.7 |
| Cholesterol-reduced Whole Egg Product | 206.07 | 100.0 |

Solids and cholesterol levels were as follows:

|  | Solids (%) | Cholesterol (mg/100 g) |
| --- | --- | --- |
| Raw Material Yolks | 44.71 | 1074 |
| Raw Material Whites | 12.01 | — |
| Concentrated Whites | 16.40 | — |
| Cholesterol-Reduced Yolks | 23.82 | 205 |
| Cholesterol-Reduced Whole Egg Product | 23.53 | 100 |
| Whole Egg Control | 24.54 | 412 |

EXAMPLE 3

Unpasteurized egg whites, 308 lbs., were circulated across a 10,000 molecular weight cutoff, spiral wound, polyethersulfone membrane with a pressure differential of 10 lbs. The concentrated whites were cooled to 40° F. before entering the membrane. The permeate was collected until the concentrated whites had a solids of 16.6%. The concentration yielded 80 lbs. of permeate and 133 lbs. of concentrated whites.

The solids levels were as follows:

|  | Solids (%) |
| --- | --- |
| Initial Egg Whites | 11.92 |
| Concentrated Whites | 16.60 |
| Permeate | 0.90 |

The resulting permeate had the following composition:

| Component | % |
| --- | --- |
| Salt | 0.32 |
| Protein | 0.03 |
| Glucose | 0.2 |
| Fructose | <0.1 |
| Sucrose | <0.1 |
| Lactose | <0.1 |
| Maltose | <0.1 |

The conventional egg white had the following composition:

| Component | % |
| --- | --- |
| Protein | 15.2 |
| Salt (Chloride) | 0.26 |
| Fructose | <0.1 |
| Glucose | 0.2 |
| Sucrose | <0.1 |
| Lactose | <0.1 |
| Maltose | <0.1 |

The permeate and concentrated whites were used in producing the whole egg cholesterol-reduced product.

EXAMPLE 4

The pasteurization system was heated up on water. The pasteurization system consisted of an APV-Crepaco SR 15 plate heat exchanger with heating and cooling sections. Between the sections was a hold tube consisting of 22 inches of 1 inch diameter pipe and 26.75 feet of 2 inch diameter pipe. Total hold tube capacity was 33.4 lbs. of egg product. Egg product was added to the tank while the system was running on water. Egg product flowed through the system at 8.0 lbs/minutes. Egg product was heated to 150° F. and then held in the hold tube for 4.18 minutes. The hold tube exit temperature was 148° F. Product was then cooled to below 40° F. before it flowed to the aseptic filler.

Product was packaged in 1 liter multi-layered composite bags manufactured by the Scholle Corporation. The aseptic filler, a Scholle Auto-Fill 10-2 Low Acid Filler in the 10-2E mode, was run through the sterilization cycle prior to filling. The flow rate through the Scholle was 8.0 lbs./minute. Fifty-two bags of product were collected, with each bag weighing approximately 2 lbs. Packaged product was 23.53% solids.

What is claimed is:

1. A method of extracting cholesterol from egg yolk, where the method comprises the steps of: combining egg white permeate produced by ultrafiltration, egg yolk and oil to form a mixture containing a ratio of oil to yolk to permeate between about 4:1:0.8 to about 1.5:1.0:0.2; shearing the mixture and recovering a cholesterol-reduced egg yolk and permeate blend by subjecting the sheared mixture to centrifugation so as to separate the oil from the egg yolk.

2. The method of claim 1, wherein the permeate is diluted with water.

3. The method of claim 1 wherein the ratio is between about 3:1:0.6 to about 2:1:0.3.

4. The method of claim 1, wherein prior to forming a mixture, egg whites are ultrafiltered at between about 40° F. to about 60° F. to form concentrated egg whites and permeate.

5. The method of claim 4, wherein the concentrated egg whites contain from about 14 weight percent to about 20 weight percent solids based on the total weight of the concentrated egg whites.

6. The method of claim 1 wherein the oil is selected from the group consisting of safflower oil, corn oil, sunflower oil, soybean oil, canola oil, olive oil and peanut oil.

7. The method of claim 5 wherein the oil is soybean oil.

8. The method of claim 1 wherein the amount of cholesterol removed from the egg yolk is from about 70 weight percent to about 85 weight percent as compared to an unprocessed whole egg control.

9. The method of claim 1 wherein the food grade acid is added at a concentration of about 0.05 weight percent to about 0.30 weight percent dry acid basis based on the weight of a final whole egg product.

10. The method of claim 9 wherein the food grade acid is added at a concentration of about 0.1 weight percent to about 0.2 weight percent dry acid basis.

11. The method of claim 9 wherein the food grade acid is selected from the group consisting of acetic acid, phosphoric acid, ascorbic acid, citric acid and lactic acid.

12. The method of claim 11 wherein the food grade acid is citric acid.

13. The method of claim 1 wherein the temperature of the mixture during shearing is between about 124° F. to about 148° F. in the mixture.

14. The method of claim 1 wherein the mixture is heated to a temperature between about 110° F. to about 125° F. prior to shearing.

15. The method of claim 13 wherein the temperature of the mixture when shearing is about 145° F. to about 148° F.

16. The method of claim 1 wherein the mixture contains not more than 14% salt.

17. A method of producing a cholesterol-reduced whole egg product, wherein said method comprises: combining egg white permeate produced by ultrafiltration, egg yolks and oil to form a mixture containing a ratio of oil to yolk to permeate between about 4:1:0.8 to about 1.5:1:0.2; shearing the mixture and recovering a cholesterol-reduced egg yolk and permeate blend by subjecting the sheared mixture to centrifugation so as to separate the oil from the mixture; wherein the blend is combined with concentrated egg whites and vegetable oil to form a cholesterol-reduced whole egg product.

18. The method of claim 17 which contains a ratio of cholesterol-reduced yolks to concentrated egg whites to vegetable oil between about 1:0.7:0.5 to about 1:1.2:0.2.

19. The method of claim 17, wherein prior to forming a mixture, egg whites are ultrafiltered at between about 40° F. to about 60° F. to form concentrated egg whites and permeate.

20. The method of claim 19, wherein the concentrated egg whites contain from about 14% to about 20 weight percent solids based on the total weight of concentrated egg whites.

21. The method of claim 17 wherein the oil is selected from the group consisting of safflower oil, corn oil, sunflower oil, soybean oil, canola oil, olive oil and peanut oil.

22. The method of claim 21 wherein the oil is soybean oil.

23. The method of claim 17 wherein the amount of cholesterol removed from the whole egg product is from about 70% to about 85% as compared to an unprocessed whole egg control.

24. The method of claim 17 wherein a food grade acid is added prior to shearing the mixture.

25. The method of claim 24 wherein the food grade acid is added at a concentration of about 0.05 weight percent to about 0.30 weight percent dry acid basis based on the weight of the final whole egg product.

26. The method of claim 25 wherein the food grade acid is selected from the group consisting of acetic acid, phosphoric acid, ascorbic acid, citric acid and lactic acid.

27. The method of claim 17 wherein the temperature of the mixture during shearing is between about 124° F. to about 148° F. in the mixture.

28. The method of claim 17 wherein the mixture is heated to a temperature between about 110° F. to about 125° F. prior to shearing.

29. The method of claim 17 wherein the temperature of the mixture when shearing is about 145° F. to about 148° F.

30. The method of claim 17 wherein the mixture contains not more than 14% salt.

31. The method of claim 17 wherein the cholesterol-reduced whole egg product is pasteurized.

32. The method of claim 17 wherein the cholesterol-reduced whole egg product is aseptically packaged.

33. The method of claim 18 wherein the vegetable oil is selected from the groups consisting of safflower oil, corn oil, sunflower oil, soybean oil, canola oil, olive oil and peanut oil.

34. The method of claim 33 wherein the oil is soybean oil.

* * * * *